2 Sheets—Sheet 1.
J. D. WILLOUGHBY.
CANAL LOCK GATE.
No. 5,885. Patented Oct. 24, 1848.
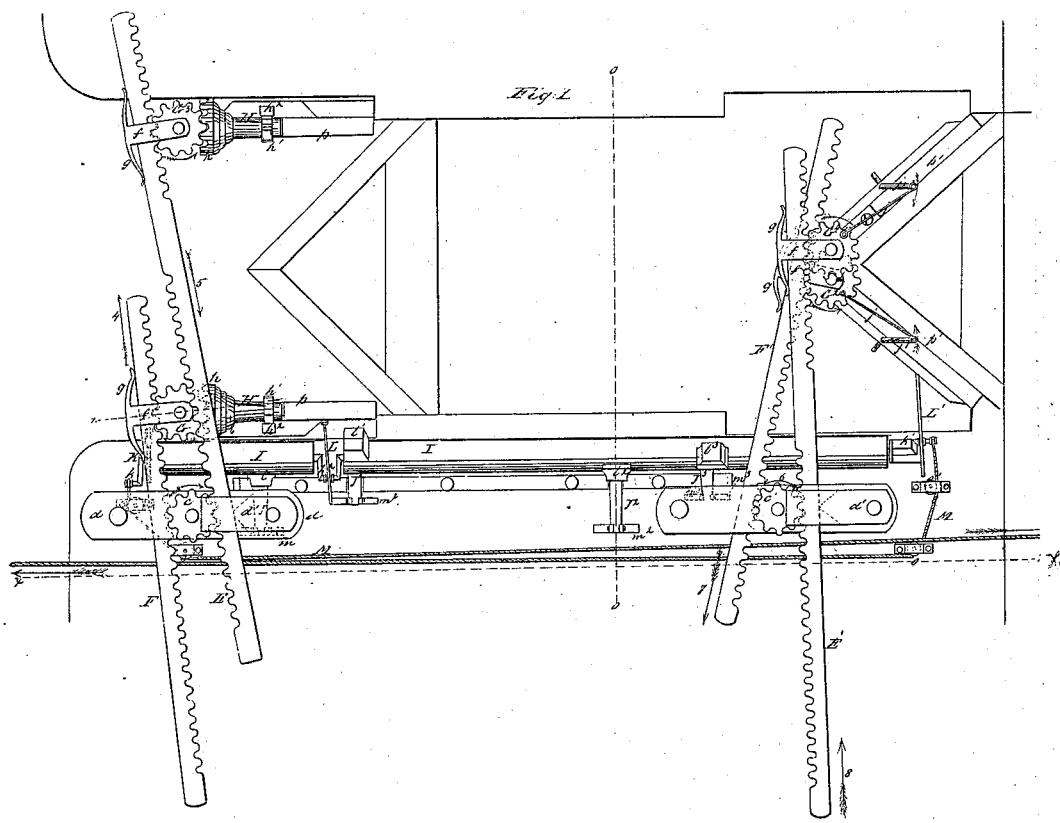
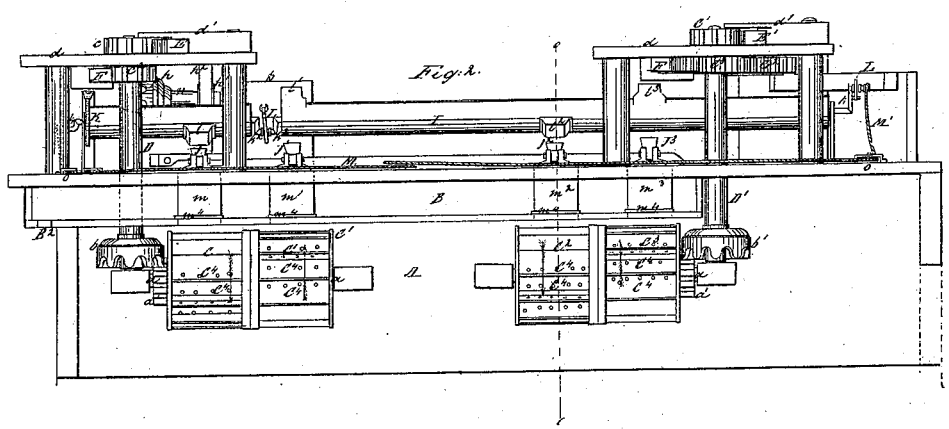

J. D. WILLOUGHBY.
CANAL LOCK GATE.
No. 5,885.  Patented Oct. 24, 1848.
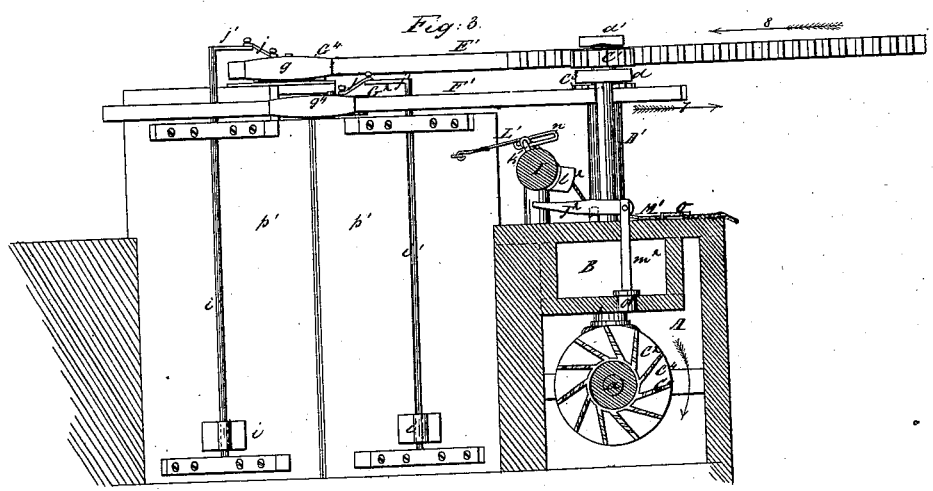
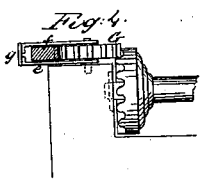

UNITED STATES PATENT OFFICE.

J. D. WILLOUGHBY, OF SUSQUEHANNA P. O., PENNSYLVANIA, ASSIGNOR TO LYMAN P. JUDSON.

METHOD OF WORKING LOCK-GATES BY WATER-POWER.

Specification of Letters Patent No. 5,885, dated October 24, 1848.

*To all whom it may concern:*

Be it known that I, J. D. WILLOUGHBY, of Susquehanna, in the county of Dauphin and State of Pennsylvania, have invented a new and useful Improvement in Locks and Gates of Canals, called the "Self-Operating Canal-Lock Gate," which is described as follows, reference being had to the annexed drawings of the same, making part of this specification.

Figure 1, is a top or birds eye view of the lock and gates, with the improvement attached to the same. Fig. 2, is a vertical longitudinal section of ditto, at the line $x$ $x$ of Fig. 1. Fig. 3, is a vertical transverse section of ditto, at the line $o$ $o$ of Fig. 1. Fig. 4 is a sectional view showing the plates $e$ and $f$ that serve to support the cog wheels G—said view being taken on the line $z$ $z$ of Fig. 1.

Similar letters in the figures refer to corresponding parts.

The nature of this invention and improvement, consists in arranging in a cavity or space on one of the sides of the basin of the canal lock, and below the upper level of the canal, four over-shot water wheels, with buckets arranged in reverse positions, to cause them to turn in different directions, when supplied with water, and secured on horizontal shafts, geared by cogged gearing to the wicket, and main swinging gates of the lock, and causing said water wheels to turn in opposite directions by applying water to the same, through openings in a trunk or flume above them, communicating with the upper level of the canal, said openings being covered by rising and falling gates operated by cams on a horizontal shaft, turned at the proper time by the drivers of the horses drawing the boats, in order to start the levers to effect the opening of the gates, and by the opening and closing of the gates themselves alternately in such a manner as to open and close the wicket and main swinging gates of the canal, at the proper time, without the assistance of the usual lock tenders, or any other agency, except that afforded by the driver of the horse of the approaching boat, in pulling a rope, to open the gates, to let on the water to the buckets of the water wheels, to effect the opening and closing of the lock gates.

A is the rectangular space or cavity formed in one of the sides of the basins of the lock, lined with masonry, on its sides, end, and bottom, to prevent the caving in of the earth surrounding the same, and communicating with the lower level of the canal, at its lower part, to allow the escape of the water from the same.

B is a horizontal trunk or flume, in the upper part of the space or cavity, its upper surface being on a line with the top of the basin of the lock, composed of wood or other suitable material, and extending from one end of the space to within a short distance of the other end of the same, and communicating with the upper canal, through openings $B^2$ near its end.

$C$, $C^1$, $C^2$, $C^3$, are overshot water wheels, arranged in the space or cavity immediately under the trunk or flume, and secured on horizontal longitudinal shafts $a$, turning in suitable boxes, in timbers extending across the cavity or space, near each end of the same, said shafts having cog wheels $a'$, on their ends, nearest the ends of the lock. Two of these water wheels are secured on each shaft, and the buckets on the periphery of each, are arranged in reverse positions to the buckets of the one next to it, so as to cause the shafts to turn in both directions when required, said buckets having small openings $C^4$ in their bottoms to allow the escape of the water from the same when standing still.

D, $D^1$, are vertical shafts, turning in steps and suitable boxes at bottom and top, and having trundle heads $b$, $b'$, or wheels with cogs on their lower surfaces, at their lower ends, meshing in gear with the cog wheels $a'$ on the end of the water wheel shafts, and having cog wheels $c$, $c^1$, $c^2$, $c^3$ at their upper ends, above and below horizontal timbers $d$, supported by uprights, over the cavities or spaces to which timbers, the boxes in which they turn are secured.

E, E', are horizontal bars of wood or iron having metallic racks on their edges near each end, and extending cross-wise over the basin of the lock, the longest racks on their ends, toward the trunk or flume B, meshing in gear with the cog wheels $c$, $c^1$, and passing between the longitudinal timbers $d$ and the ends of timbers $d'$, secured on said timbers $d$.

F, F', are other bars of wood, or iron arranged below the level of those mentioned above, and made similar to the same, except that they are shorter, and have metallic rack only on one edge, extending their full length, and meshing in gear with the lower cog wheels $c^2$, $c^3$, on the vertical shafts D, D', and also with the cog wheels $G^3$, $G^4$.

G, G' are horizontal cog wheels secured on vertical axles turning at their lower ends in steps in the tops of the lock gates $p$, $p'$, near their outer edges, and in openings in metallic plates $f$, at their upper ends, which plates are connected at their outer ends to similar formed plates $e$ arranged below the cog wheels G, $G^2$, and bars E, E', F, F having openings in them through which the lower parts of the axles pass, in a similar manner to those above the wheels and bars, said upper and lower plates $e$, $f$, being connected together at their ends, as stated, by a semi-eliptical spring bar $g$, curved at its ends and resting against the edges of the bars E, E, F, F', for holding them against the cog wheels G, G', $G^3$, $G^4$, and guiding their movements crosswise. These cog wheels, and shafts, on which they are secured, are arranged at different heights, those on the gates on the right hand side of the canal being on the same level as the upper bars E, E', and meshing in gear with the racks on their edges, and those on the left hand gates of the lock being on the same level with the bars F, F', and meshing in gear with the racks on their edges.

H are horizontal shafts, turning in spaces formed in the upper ends and edges of the lock gates, in suitable boxes secured to said gates, and having trundle heads $h$, or wheels with cogs on their faces, at one of their ends meshing in gear with the cog wheels with which the bars engage, and having cog wheels or pinions $h'$ near their opposite ends, meshing in gear with racks on the sides of the vertical bars $h^2$, of the usual rising and falling wicket gates, moving in guides at the lower part of the lock gates. Swinging wicket gates $i$, may be used instead of the rising and falling wickets described above, in which case the horizontal shafts H, trundle heads $h$, and other parts necessary to give motion to the sliding wicket gates, will be dispensed with, and the vertical shafts $i'$, of the swinging wicket gates, connected to the cog wheels $G^2$, $G^4$, at the upper part of the lock gates meshing in gear with the bars, by pitman or connecting rods $j$ or bars, attached to cranks $j'$ on the upper ends of said wicket gate shafts $i'$, and to the upper surfaces of the cog wheels $G^2$, $G^4$, by pins inserted in them, in such relation to their centers, and the positions of the lock gates, and cranks $j'$, as to cause them to turn and open and close the wickets, at the same time as the slide wicket gates described above, as represented at the lower lock gate in Figs. 1, 2, and 3.

I is a horizontal longitudinal shaft, turning in boxes in uprights on the side of the lock, and extending nearly the length of the same, having cranks $k$, $k'$, at each end, and a crank $k^2$, opposite the upper gates of the lock, and four cogs or cams $l$, $l^1$, $l^2$, $l^3$, projecting from its periphery, opposite the water wheels, in the cavity or space.

J, $J^1$, $J^2$, $J^3$, are levers, turning on fulcrums between their ends, secured to the top of the flume or trunk, and terminating at their inner ends immediately below the longitudinal shaft, and cams on the same, and extending at right angles to the same, and connected at their opposite ends, by pins, to the upper ends of rising and falling oblong gates $m$, $m^1$, $m^2$, $m^3$, passing through openings in the top of the flume or trunk, to the bottom of the same, and having flat timbers $m^4$ on their lower ends, covering similar formed oblong openings in the bottom of the flume or trunk, above the water wheels, and each opening being on the sides of their centers respectively to agree with the position of their buckets.

K is a ratchet wheel, secured on one end of the longitudinal shaft, I, on which rests the end of a pawl turning on a pin in an upright on the side of the shaft, to prevent its turning back.

L, $L^1$, are iron rods or bars, attached at one end to the left hand gates of the lock, by a pin or staple upon which they turn, and having slots $n$, at their opposite ends, through which the wrists of the cranks $k^2$, $k^1$, on the longitudinal shaft I, opposite the gates, pass, said slotted rods or bars L, $L^1$, being guided in their movements over the wrists by shoulders on said wrists, between which they move.

M, $M^1$, are cords or wires, attached to the cranks on the end of the longitudinal shaft, and passing over pulleys $o$ whose axles turn in boxes above the trunk or flume, and extending one up, and the other down the tow path or bank of the canal about one hundred feet above and below the lock.

The manner of operating the canal lock, and parts attached to the same, described above, is as follows: Assuming the upper wicket gates and upper gates $p$, of the lock, to be open as represented in Fig. 1, the lower wicket, and lock gates $p^1$, to be closed, and a boat approaching the lock, from the canal below, to pass through the same, and within one hundred feet thereof. The driver of the horse drawing the boat, draws the wire or cord M, attached to the crank $k$, on the upper end of the horizontal shaft I, and turns said shaft sufficiently far to cause the cog or cam $l$ on the same, nearest the upper level of the canal, to press down the end of the lever J, under the same, and raise the gate $m$, covering the opening in the bottom of the trunk or flume B, over the water wheel C and allow the water to fall into the buckets of the same, which causes said wheel to turn in the direction indicated by the arrow in Fig. 2, and to give motion to the vertical shaft D, to which it is geared by the cog wheel $a'$, and trundle head $b$, in the direction indicated by the arrow in Fig. 1. This vertical shaft being geared to the racks in the bars E, F, by the cog wheels $c$, $c^2$, causes them to move crosswise, in different directions, indicated by arrows 4, 5, and to turn the cog wheels G G$^3$, at the upper parts of the upper lock gates $p$, geared to the racks on their edges, and to also turn the horizontal shafts H, turning in boxes in the upper part of the upper lock gates $p$, to which the said cog wheels G G$^3$ are geared, and to force down and close the wickets of the upper gates by the pinions $h^1$, on said shafts, meshing in gear with the racks on the bars $h^2$, of said wicket gates, and to close the upper lock gates, causing the slotted rod or bar L, attached to the left gate to move over the wrist of the crank, passing through the slot in the same, and the end of the slot, farthest from the gate, to draw said wrist, and turn the longitudinal shaft I, sufficiently far, to disengage the cog or cam $l$ from the end of the lever J, and allow the gate $m$, to descend on the opening in the bottom of the trunk or flume, below the same, and stop the flow of water to the buckets of the water wheel C;—and at the same time cause the cog or cam $l^2$ on said longitudinal shaft I, to press down the end of the lever J$^2$, below the same, and raise the sliding gate $m^2$ from the opening in the bottom of the trunk or flume, over the water wheel C$^2$, on the shaft, near the lower part of the canal, and allow the water to fall on the buckets of the same, and turn the shaft on which it is secured, in the same direction as the shaft near the upper level of the canal, was turned by the water wheel C,—which causes the vertical shaft D$^1$ near the lower canal, to turn in the direction indicated by the arrow 6 in Fig. 1, and to move the bars E$^1$, F$^1$, geared to the cog wheels $c^1$, $c^3$, on its upper end by the racks on their edges in the direction indicated by the arrows, 7 and 8, and to raise and open the wickets of the lower gates, geared to them in a similar manner to the wickets of the upper gates, and to allow the water to flow from the basin of the lock through said wickets into the lower level of the canal, until it is reduced to nearly the same level in the basin, as the water in the lower part of the canal, and the pressure from the same on the gate $p^1$, is rendered less than the weight of the water in the buckets of the wheel C$^2$, when said lower lock gates will be drawn open by the bars E$^1$, F$^1$, and the longitudinal shaft I, turned by the end of the slot $n$, nearest the lock, in the rod or bar L$^1$, attached the left gate, pressing against the wrist of the crank $k^1$, on the lower end of said shaft, passing through the same, so as to disengage the cog or cam $l^2$, on the shaft I from the end of the lever J$^2$, and allow the gate $m^2$, on its opposite end to descend and stop off the water from the wheel C$^2$ or the wickets may be arranged and operated in the manner represented in Fig. 1—that is to say they may be turned on horizontal axles by cranks and rods.

The boat is then floated into the basin of the lock, and the longitudinal shaft I, turned so as to cause the cog or cam $l^3$, on the same, to press against the end of the levers J$^3$, below the same, and raise the gate $m^3$, and allow the water to descend from the trunk or flume, through the opening below said gate, on to the buckets of the water wheel C$^3$, which buckets being arranged in reverse positions in relation to the wheel, to those on the water wheel C$^2$, causes the vertical shaft D' and the bars E', F', and parts geared to the wicket gates, to turn in reverse directions, and close the lower wickets, and lock gates $p$, to the position represented in Fig. 1, in a similar manner to the closing of the wicket gates, and lock gates near the upper part of the canal, described above, and to cause the end of the slot $n$, (in the rod or bar L', attached to the left gate), nearest the gate, to draw the wrist of the crank $k'$, and now below its center, passing through the same, and turn the longitudinal shaft I and disengage the cog or cam $l^3$ from the end of the lever J$^3$ below the same, and allow the gate $m^3$, to descend, and stop off the water to the buckets of the water wheel C$^3$ and at the same time cause the cam $l'$ on said shaft I, to depress the end of the lever J', under the same, and raise the gate $m'$, and let the water on to the wheel C', and cause the upper gates $p$ to open to the position represented in Fig. 1, and disengage the cam $l'$, and stop off the water to the wheel C'. The boat is then floated into the upper part of the canal, and the upper wickets and lock gates $p$, left open for the reception of a boat from the upper level of the canal, as represented in Figs. 1 and 2. But should a boat again approach the lock from the lower level these gates must be closed and the others opened.

When it is desired to pass a boat through the lock, from the upper part of the canal to the lower part of the same, the driver draws the wire or rope M', extending up the towpath, or bank, of the canal, and attached to the crank $k'$ on the lower end of the longitudinal shaft I, and causes the upper and lower gates $p$, $p'$, to be opened and closed in their respective orders, in the manner above described.

What I claim as my invention and desire to secure by Letters Patent is,—

1. Opening and closing the gates and wickets of canal locks by the power of the waste water applied by means of a combination of over shot wheels affixed to horizontal shafts having the buckets of every alternate wheel arranged in opposite directions for the purpose of reversing the motion of the wheels for opening and closing the gates said wheels being made to act upon the gates through the agency of a combination of cog wheels, shafts, rack rods, pinions, cranks, & rods arranged and operated in the manner substantially as above set forth, or other mode substantially the same by which analogous results are produced.

2. I also claim the combination of the revolving shaft I—cams $l\ l'\ l^2\ l^3$ cranks $k\ k'\ k^2$ cords M M' with the levers J J' $J^2$ $J^3$—gates $m\ m'\ m^2\ m^3$ and flume B for letting the water onto the wheels—the several parts being arranged and operated in the manner above described or other mode that is substantially the same.

3. I likewise claim the combination of the vertical shaft D and cogged wheels $c\ c^2$ and the racked bars E F, with the cogged wheels G, $G^3$, $h$, $h$—pinions $h'$, $h'$, cogged stems $h^2$, $h^2$, attached to the wicket gates for opening and closing the main gates and the wicket gates therein by the turning of the water wheels $c$, $c'$ as aforesaid.

4. I also claim the combination of the crank rods $i'$, $j'$, and connecting rods $j$ with the cog wheels $G^2$ $G^4$ rack rods F' E' and shaft D' turned by the water wheels $C^2$ $C^3$ for opening and closing the lower gates and their wickets as described.

5. I likewise claim the combination of the rods L, L', with the gates $p$, $p'$ and cranks $k'$ $k^2$ for turning the cam shaft by the opening and closing of the gates to which the rods are attached as described.

In testimony whereof I have hereunto signed my name before two subscribing witnesses this 25th day of February 1848.

JAMES D. WILLOUGHBY.

Witnesses:
 EDMUND MAHER,
 A. E. H. JOHNSON.